UNITED STATES PATENT OFFICE.

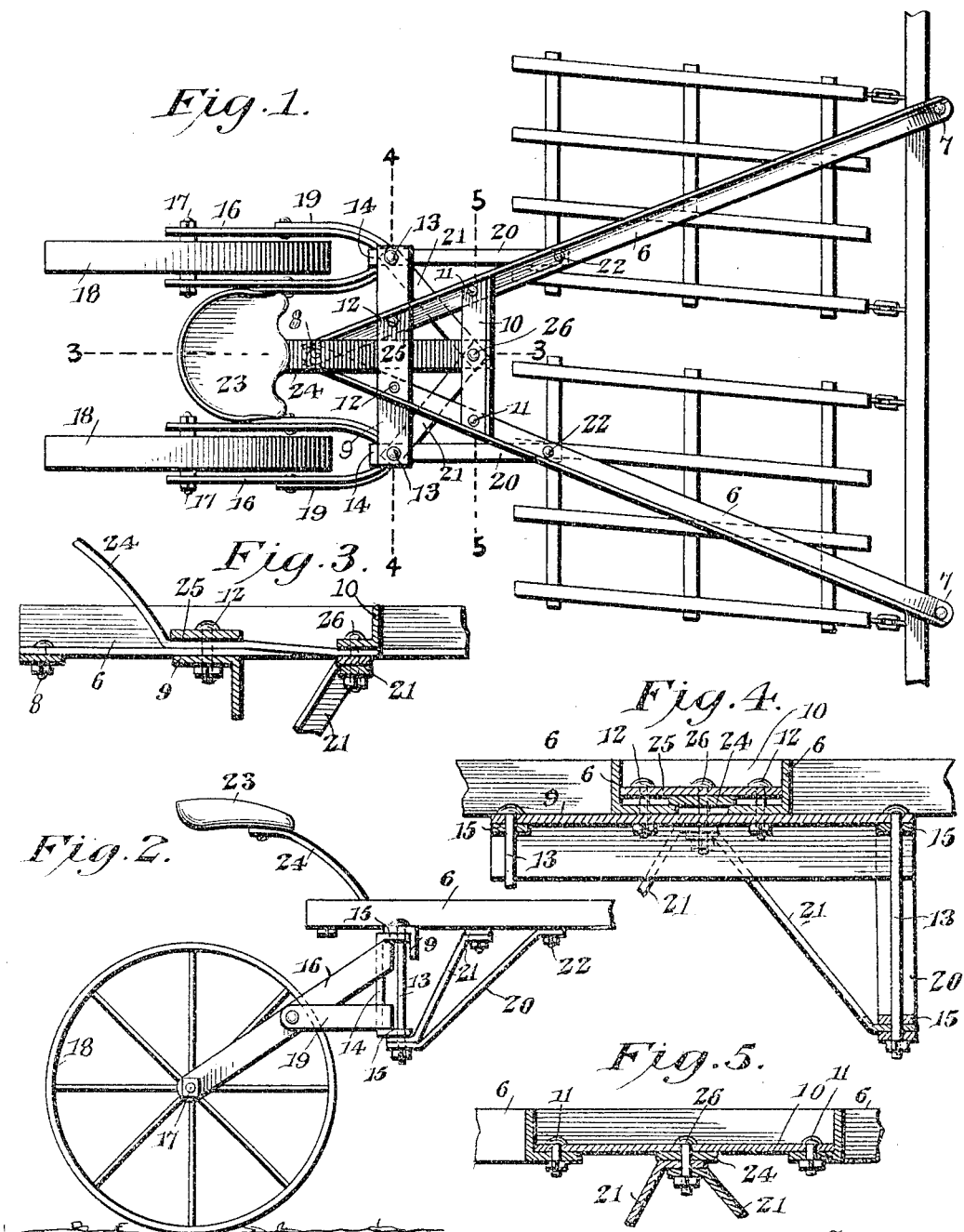

NICKLAS H. BLOOM, OF NASHUA, IOWA.

RIDING ATTACHMENT FOR AGRICULTURAL IMPLEMENTS.

No. 804,702. Specification of Letters Patent. Patented Nov. 14, 1905.

Application filed April 15, 1905. Serial No. 255,798.

*To all whom it may concern:*

Be it known that I, NICKLAS H. BLOOM, a citizen of the United States, residing at Nashua, in the county of Chickasaw and State of Iowa, have invented a new and useful Riding Attachment for Agricultural Implements, of which the following is a specification.

This invention relates especially to that type of attachment set forth in prior patents numbered 684,783 and 779,519, granted to me respectively on October 22, 1901, and January 10, 1905.

The object in view is to provide a novel, simple, and efficient form of frame that can be and preferably is formed of angle-iron, is very strong, rigid, and durable, and can be inexpensively manufactured, inasmuch as the parts are simple and the bolts or fasteners employed in a variety of instances constitute means for fastening a number of elements together.

The preferred embodiment of the invention is illustrated in the accompanying drawings, wherein—

Figure 1 is a plan view of the attachment, showing the same applied to a harrow. Fig. 2 is a side elevation of a portion of the attachment. Fig. 3 is a detail longitudinal sectional view on the line 3 3 of Fig. 1. Fig. 4 is a cross-sectional view on the line 4 4 of Fig. 1. Fig. 5 is a cross-sectional view on the line 5 5 of Fig. 1.

Similar reference-numerals designate corresponding parts in all the figures of the drawings.

In the embodiment illustrated a pair of convergently-disposed reach-bars 6 are employed, preferably formed of angle-iron and having their front end portions downturned with the terminals offset to provide ears 7, whereby the same can be attached to a harrow or other agricultural implement. The rear ends of the reach-bars are joined, the horizontally-disposed flanges thereof being overlapped and a bolt 8 being passed therethrough. Secured to and connecting the reach-bars in advance of their juncture and preferably located against the under side thereof is a rear cross-bar 9, formed of angle-iron having a horizontally-disposed flange and a depending flange, as shown particularly in Fig. 3. This cross-bar 9 extends beyond the outer sides of the reach-bars a considerable distance, as illustrated. Located in advance of the rear cross-bar and between the reach-bars is a front cross-bar 10, formed of angle-iron and having its terminals resting upon the horizontal flanges of said reach-bars. The cross-bars are secured to the reach-bars by suitable bolts 11 and 12.

Connected to the ends of the rear cross-bar 9 are downwardly-extending journal or king bolts 13, upon which are mounted wheel-frames. Said frames are similar to those set forth in the former patent, No. 779,519, to which reference has already been made, the same comprising uprights having offset terminal ears 15, through which the journal-pins 13 pass. Secured to the uprights 14 are side arms or plates 16, each set being formed from a bowed strip, and through the ends of the same are passed axles 17 of ground-wheels 18. Brace-arms 19, also formed of bowed strips, have their terminals connected to the side arms 16, between the ends thereof, said strips extending about the lower portions of the uprights 14 and being secured thereto. The lower ends of the journal or king pins 13 are held in place by angularly-disposed stays or braces 20 and 21, the braces 20 extending upwardly and forwardly and being secured, as shown at 22, to the reach-bars in advance of the front cross-bar 10. The other braces 21 extend inwardly, forwardly, and upwardly and have overlapped front terminals disposed beneath the central portion of the cross-bar 10.

A suitable seat 23, located above and between the ground-wheels, has a spring-standard 24, that passes over the rear cross-bar 9 and beneath the front cross-bar 10. Located across this standard over the rear cross-bar 9 and between the reach-bars is a clip-plate 25, said clip-plate being secured in place by the bolts 12, which fasten the cross-bar 9 to the reach-bars 6. It will thus be seen that the clip-plate is clamped upon the standard and the reach-bars are secured to the cross-bar by common means. The front end of the standard 24 is interposed between the central portion of the front cross-bar 10 and the terminals of the inwardly-extending braces 21. Through these overlying elements is passed a fastening-bolt 26, constituting common means for securing the braces and the standard to the cross-bar.

It will thus be seen that a well-braced rigid frame is provided, which will permit the necessary play of the wheels and at the same time will maintain the journals for the wheel-frames relatively fixed and immovable. The structure, moreover, can be inexpensively manufactured, as the various elements can be formed from ordinary angle and strap iron, and, furthermore, as already pointed out, the bolts, rivets, or other fasteners in certain instances are employed for connecting a comparatively great number of parts.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a riding attachment of the class described, the combination with reach-bars, of a cross-bar disposed transversely thereof, a seat having a standard extending across the cross-bar, and means for securing the standard to the cross-bar, said means also constituting connections between the cross and reach bars.

2. In a riding attachment of the class described, the combination with reach-bars, of a cross-bar disposed transversely thereof, a seat having a standard extending across the cross-bar, a clip for the standard, and bolts located on opposite sides of the standard for connecting the clip, the cross-bar, and reach-bars.

3. In a riding attachment of the class described, the combination with reach-bars, of cross-bars secured thereto, an upright journal-pin connected to one of the cross-bars, a brace connected to the pin and associated with the other cross-bar, a seat having a standard also associated with the latter cross-bar, and a fastening device connecting the cross-bar, the standard and the brace.

4. In a riding attachment of the class described, the combination with reach-bars, of front and rear cross-bars secured thereto, upright journal-pins connected to the ends of the rear cross-bar, braces connected to the journal-pins and having terminals associated with the front cross-bar between the reach-bars, a seat having a standard also associated with the front cross-bar, and fastening means passing through the front cross-bar, the standard, and the braces.

5. In a riding attachment of the class described, the combination with convergently-disposed reach-bars, of a rear cross-bar connected to the reach-bars and projecting beyond the outer sides thereof, a front cross-bar connecting the reach-bars in advance of the rear cross-bar, upright journal-pins having their upper ends connected to the ends of the rear cross-bar, ground-wheel supports journaled on the pins, convergently-disposed braces connected to the lower ends of the pins and having their front ends overlapped beneath the front cross-bar, a seat having a standard associated with the cross-bars, a fastening-bolt passing through the front cross-bar, the standard, and the overlapped braces, and forwardly-extending cross-bars connected to the lower ends of the pins and to the reach-bars.

6. In a riding attachment of the class described, the combination with convergently-disposed reach-bars having their ends joined, of spaced connections bridging the space between the bars in advance of the joined ends, a ground-wheel support attached to said spaced connections, and a seat having a standard secured to said connections.

7. In a riding attachment of the class described, the combination with convergently-disposed reach-bars having their rear ends joined, of spaced cross-bars bridging the space between the bars in advance of their joined ends, ground-wheel supports connected to the cross-bars, and a seat having a standard extending across the cross-bars between the reach-bars and secured thereto.

8. In a riding attachment of the class described, the combination with convergently-disposed reach-bars of angle-iron having their rear ends overlapped and secured together, of a rear cross-bar connecting the reach-bars in advance of their joined ends, journal-pins connected to the ends of the rear cross-bar, a front cross-bar located in advance of said rear cross-bar, braces connecting the journal-pins with the front cross-bar and with the reach-bars, a seat having a standard associated with the front and rear cross-bars between the reach-bars, and ground-wheel supports journaled on the pins.

9. In a riding attachment of the class described, the combination with reach-bars, of front and rear cross-bars secured thereto, upright journal-pins connected to the ends of the rear cross-bar, braces connected to the journal-pins and having terminals associated with the front cross-bar between the reach-bars, and fastening means passing through the front cross-bar and the braces.

10. In a riding attachment of the class described, the combination with convergently-disposed reach-bars formed of angle-iron having their rear ends overlapped and joined, of connections bridging the space between the bars in advance of the joined ends, and a ground-wheel support attached to said connections.

11. In a riding attachment of the class described, the combination with convergently-disposed reach-bars formed of angle-iron having their inner and rear ends overlapped and joined, of a cross-bar bridging the space between the bars in advance of their joined ends, ground-wheel supports connected to the cross-bar, and means for securing the cross-bar to the reach-bars.

12. In a riding attachment of the class described, the combination with convergently-disposed reach-bars of angle-iron having their rear ends overlapped and secured together, of a rear cross-bar connecting the reach-bars in advance of their joined ends, journal-pins connected to the ends of the rear cross-bar, a front cross-bar located in advance of said rear cross-bar, braces connecting the journal-pins with the front cross-bar and with the reach-bars, and ground-wheel supports journaled on the pins.

In testimony that I claim the foregoing as my own I have hereto affixed my signature in the presence of two witnesses.

NICKLAS H. BLOOM.

Witnesses:
W. F. GETSCH,
R. F. WENTWORTH.